April 22, 1969 M. C. HENDERSON 3,440,480

DISPLAY APPARATUS INCLUDING MEANS FOR VARYING LINE WIDTH

Filed Jan. 20, 1967 Sheet 1 of 2

INVENTOR.
MARTIN C. HENDERSON

BY Lindenberg + Freilich

ATTORNEYS

INVENTOR.
MARTIN C. HENDERSON
BY Lindenberg & Freilich
ATTORNEYS

1

2

3,440,480

DISPLAY APPARATUS INCLUDING MEANS FOR VARYING LINE WIDTH

Martin C. Henderson, Canoga Park, Calif., assignor to The Bunker-Ramo Corporation, Canoga Park, Calif., a corporation of Delaware Filed Jan. 20, 1967, Ser. No. 610,623

Int. Cl. H01j *29/70*

U.S. Cl. 315—18 8 Claims

ABSTRACT OF THE DISCLOSURE

Cathode ray tube (CRT) display apparatus including means for displaying lines of different width or thickness. Lines are drawn by moving the CRT beam between a pair of desired end points while very rapidly deflecting the beam through a small circular path. Thus, a line is formed actually comprised of a multitude of identical overlapping circles. The diameter of the circles establishes the line thickness. The beam is deflected in a circular path in response to signals applied to horizontal and vertical deflection coils, each of which forms part of an oscillator or tuned circuit.

The invention herein described was made in the course of or under a contract or subcontract thereunder, with Department of the Air Force, Rome Air Development Center.

*Background of the invention*

This invention relates generally to display apparatus as, for example, of the cathode ray tube (CRT) type, and more particularly to means for use therewith for selectively drawing lines of different thickness.

Display systems, e.g., of the CRT type, are finding increasing utility as input/output means for use with digital data processing systems in many diverse applications. In some of these applications it is desirable that the system be able to display lines of different width or thickness.

*Summary of the invention*

In accordance with one aspect of the present invention, thick lines are drawn on a CRT face by gradually deflecting the gross position of the CRT beam along a desired line which can be either straight or curved, while simultaneously rapidly and repeatedly moving the beam through a small path, e.g., a circle, having a component substantially perpendicular to the line. The resulting series of overlapping circles will appear to an observer as a solid line. The thickness of the line will be established by the diameter of the circles.

In accordance with a further aspect of the present invention, the means provided for rapidly deflecting the CRT beam in a circular path is comprised of an oscillator circuit which includes as a part thereof, one of the CRT magnetic deflection coils. In the preferred embodiment of the invention a tuned circuit, including the second magnetic deflection coil, is reactively coupled to the oscillator circuit.

Figure 1:
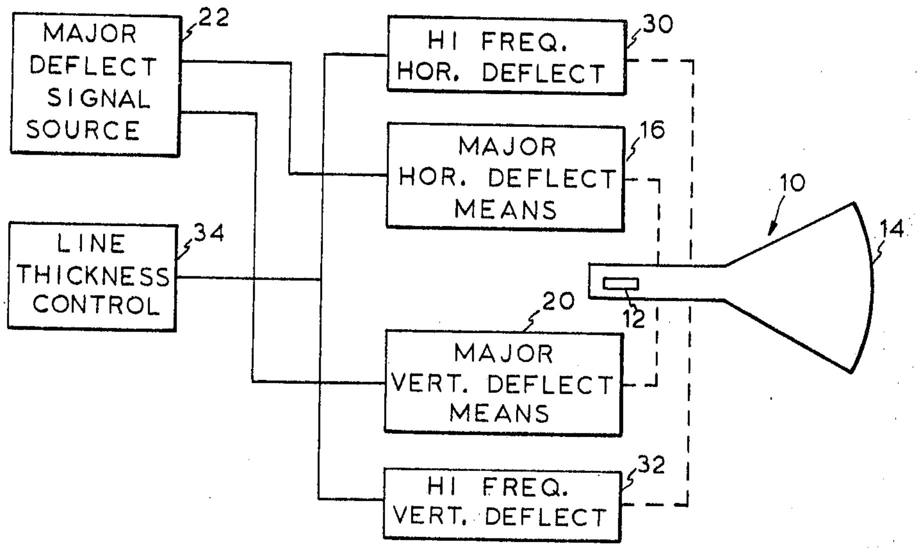
FIGURE 1 is a block schematic diagram of a cathode ray tube display system incorporating apparatus in accordance with the present invention.

Attention is now called to FIG. 1 which illustrates a display device 10, e.g., a cathode ray tube (CRT). The display device 10 includes a source 12, e.g., an electron gun, a deflectable writing means able to describe patterns on a target 14 such as the cathode ray tube face.

Figure 2:
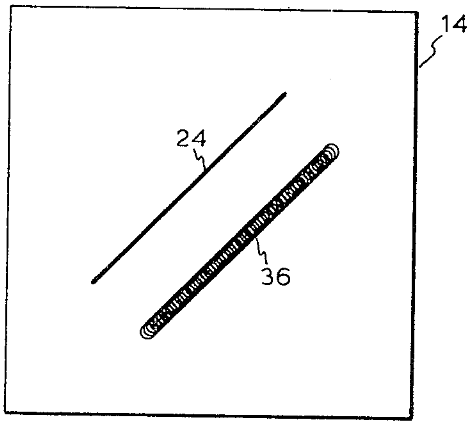
FIG. 2 is a schematic illustration representing the manner in which lines of different thickness can be drawn on a CRT face in accordance with the present invention.

In order to selectively deflect the cathode ray tube beam a major horizontal deflection means 16 is provided which acts orthogonally to the action of a major vertical deflection means 20. The major horizontal and vertical deflection means 16 and 20 are controlled in response to signals provided by a major deflection signal source 22. The nature of the source 22 and of the deflection means 16 and 20 is not critical to the present invention. As an example, the signal source 22 can comprise a conversion device responsive to digital positioning signals for providing analog deflection signals to the deflection means 16 and 20 which can, for example, comprise magnetic deflection coils. The apparatus thus far recited is well known in the art and enables the CRT beam to be deflected along a desired path between two defined end points to thus draw a line 24 as illustrated in FIG. 2. The thickness of the line 24 in conventional CRT display equipment is determined by the extent of beam focusing employed. Regardless of how thick the line 24 normally is, conventional display systems do not normally provide means for varying the thickness of the line 24. Thus, the thickness of the displayed line 24 for any particular CRT will be uniform although the thickness may vary slightly from one CRT to another. It has been found that in certain applications, it is desirable to be able to vary the thickness of the lines displayed on the CRT face 14. The present invention is directed to apparatus for enabling the line thickness to be selectively varied.

Briefly, in accordance with the present invention an auxiliary horizontal deflection means 3 and an auxiliary vertical deflection means 32 are provided. The deflection means 30 and 32 are controlled in response to a line thickness control means 34. In response to signals provided by the control means 34 the deflection means 30 and 32 deflect the CRT beam at a very high rate, preferably along a substantially closed path such as a circle. As the deflection means 30 and 32 are very rapidly and repeatedly causing the beam to trace a small circular pattern, the major deflection signal source 22 can cause the major deflection means to gradually change the gross position of the beam. As a consequence, as is shown in FIG. 2, the beam will trace a series of overlapping circles which will appear to an observer as a thick solid line 36 if the relative rates of movement caused by the major and auxiliary deflection means are properly selected. That is, if the gross position of the beam is changed too rapidly, then the small circles will be apparent to an observer. However, if the circles are drawn sufficiently rapidly relative to the gross beam movement, then the series of circles will appear substantially solid as illustrated by line 36 in FIG. 2. It should be appreciated that the solid line effect could also be produced by rapidly drawing small patterns other than circular patterns. In fact, any pattern having a component essentially perpendicular to the gross movement of the beam can suffice to thicken the line. However, selection of a circular pattern is desirable for at least two reasons. Initially, signals for drawing circular patterns can be generated more easily than signals for other patterns, and secondly, utilization of the circular pattern assures a motion component perpendicular to the gross movement of the beam regardless of the direction in which the beam is moved.

Figure 3:
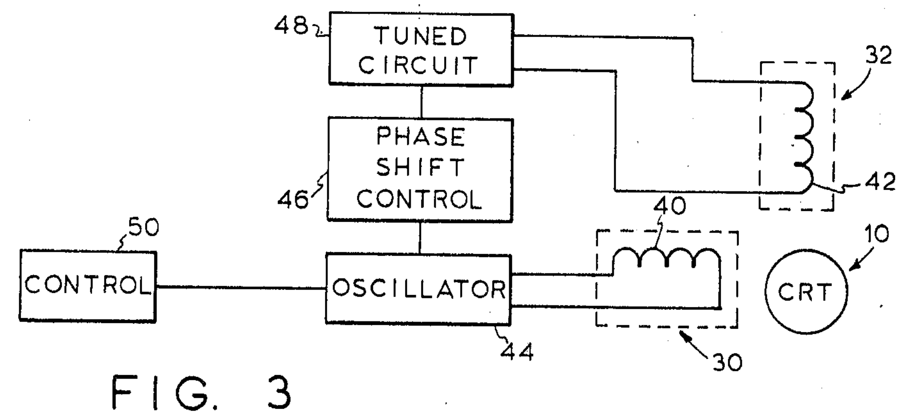
FIG. 3 is a block schematic diagram illustrating apparatus in accordance with the present invention for deflecting the CRT beam in a circular path.

Attention is now called to FIG. 3 of the drawings which comprises a block schematic diagram of an apparatus in accordance with the present invention for controlling the auxiliary deflection means for causing the beam to describe a circular pattern shown in FIG. 2. As shown in FIG. 3, the auxiliary horizontal deflection means 30 is comprised of a magnetic deflection coil 40. Similarly, the auxiliary vertical deflection means 32 is comprised of a coil 42.

An oscillator circuit 44 is coupled to the coil 40 and produces a substantially sinusoidal signal therein. The oscillator circuit 44 is coupled by means 46 to a tuned circuit 48 which supplies a substantially sinusoidal signal to the coil 42. By assuring that the sinusoidal signals to the coils 40 and 42 are substantially 90° out of phase, it should be appreciated that the beam will be caused to describe a circular pattern. The diameter of the circular pattern will be determined by the amplitude of the sinusoidal signals applied to the deflection coils 40 and 42. The amplitude of the signals is controlled by control means 50. By controlling the amplitude of oscillation in the oscillator 44 it will be appreciated that the thickness of the line consequently drawn will be correspondingly controlled.

Figure 4:
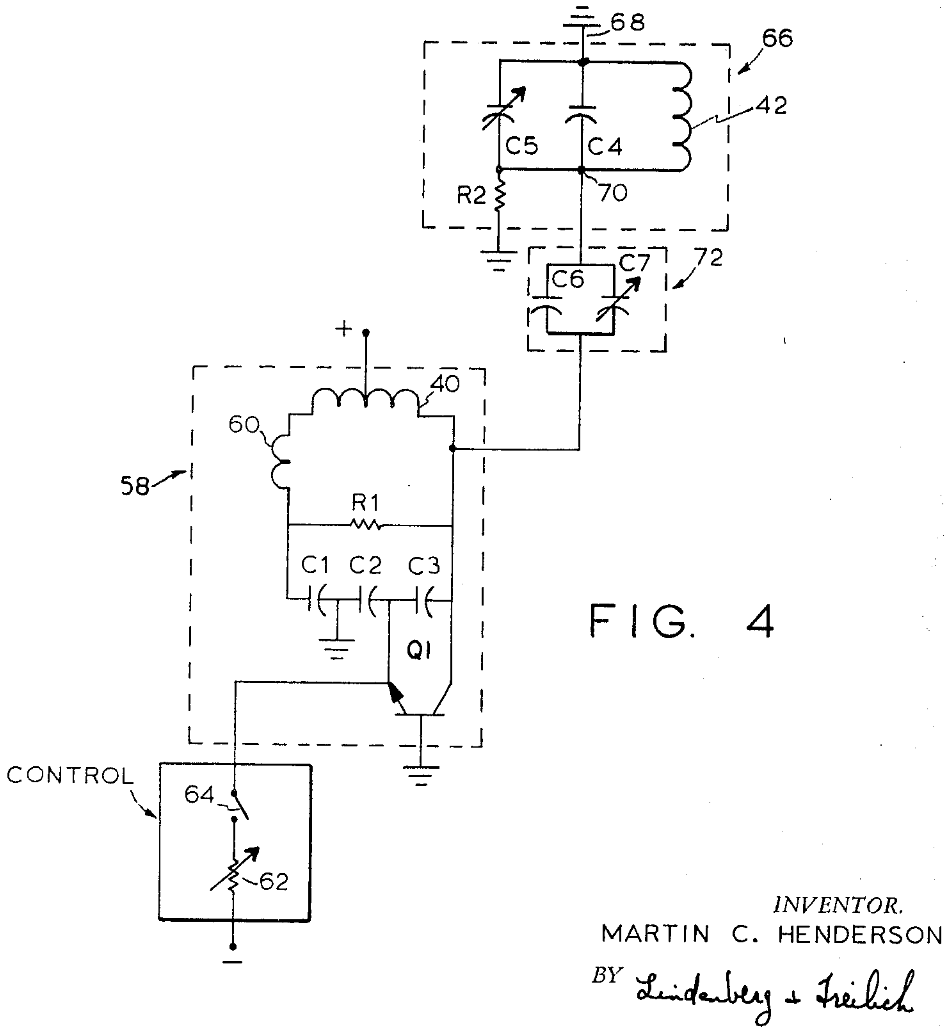
FIG. 4 is a schematic diagram illustrating the apparatus of FIG. 3 in greater detail.

Attention is now called to FIG. 4 which illustrates a preferred circuit embodiment of the apparatus illustrated in FIG. 3. More particularly, the magnetic deflection coil 40 is connected as part of a high frequency oscillator circuit 58 which includes a transistor amplifier Q1. The base of transistor Q1 is connected to a source of reference potential such as ground. The collector of transistor Q1 is connected to one side of the coil 40. Connected in series with the coil 40, for reasons to be indicated hereinafter, is an additional coil 60 which, though providing inductance in series with the coil 40, is not positioned so as to influence the CRT beam. A mid-point of the coil 40 is connected to a source of positive potential.

A resistor R1 is connected in parallel with the serially conected coils 40 and 60. Serially connected capacitors C1, C2, and C3 are connected across resistor R1. The junction between capacitors C1 and C2 as illustrated is connected to ground. The junction between capacitor C2 and C3 as illustrated is connected to the emitter of transistor Q1. Additionally, the emitter of transistor Q1 is connected through control means 50 to a source of negative potential. The control means 50 can include a variable resistor 62 connected in series with a switch 64.

It will be recognized that the circuitry 58 essentially comprises a Colpitts oscillator employing as the primary inductance thereof, the deflection coil 40.

A tuned circuit 66 is comprised of the deflection coil 42 connected in parallel with a fixed capacitor C4 and a variable capacitor C5. One end of coil 42 is connected to ground as at 68 while energy is coupled into the coil 42 at its other terminal 70 from the amplifier Q1 by a phase shifting coupling network 72. The network 72 is comprised of a fixed capacitor C6 connected in parallel with a variable capacitor C7. A resistor R2 couples terminal 70 to ground.

It should be appreciated that the circuitry 66 comprises a tuned circuit whose resonant frequency, employing properly selected components, can be adjusted to correspond to the frequency of oscillator 58.

In operation, the amplifier Q1 will oscillate producing an essentially sinusoidal signal in the magnetic deflection coil 40. The amplitude of the oscillations, or in other words, the current through the amplifier Q1 will be determined by the setting of the variable resistor 62.

As is well known, an LC circuit reactively coupled to a signal source at its resonant frequency gives a phase shift of 90°. Thus, the tuned circuit 66 which is reactively coupled to the oscillator 58 by the coupling circuit 72 will oscillate to produce a signal in the deflection coil 42 which is displaced from the signal in deflection coil 40 by substantially 90°. Consequently, inasmuch as the coils 40 and 42 are physically displaced by 90°, as shown in FIG. 3, the beam will be deflected in a substantially circular pattern. The variable capacitor C5 enables the resonant frequency of the tuned circuit 66 to be adjusted to thus enable the phase of the current through coil 42 to be precisely adjusted.

The oscillatory energy in the secondary circuit, i.e., the tuned circuit 66, will be coupled back to the primary circuit, i.e., the oscillator circuit 58. The reactance thus coupled into the primary circuit modifies its effective resonant frequency and frequency of oscillation. With essentially identical primary and secondary resonant circuits, and with coupling sufficient to produce equal amplitude in both circuits, oscillation at a frequency to give exactly a 90° phase difference is impossible. Thus, one of the circuits, i.e., the circuit 58, must oscillate with a greater amplitude to achieve the desired 90° phase difference, and yet it is desirable that the coils 40 and 42 develop equal magnetic field intensities at the center of the CRT tube in order to develop a circular rather than elliptical pattern. It is therefore desirable to design the circuit 58 so that the magnetic field intensity developed by the coil 40 in the tube is substantially less for a given reactive stored energy than the magnetic field intensity developed by the winding 42 for the same amount of reactive stored energy. It is for this purpose that the coil 60 which does not contribute to the magnetic field intensity within the tube is utilized. It is recognized that in lieu of utilizing the series coil 60, the magnetic field intensities at the center of the tube created by the coils 40 and 42 could be equalized by physically modifying their relationship with respect to the tube.

From the foregoing it should be appreciated that an apparatus has been disclosed herein which enables lines of different thickness to be produced by a cathode ray tube beam by causing the beam to move very rapidly and repeatedly in a circular pattern as the gross position of the beam is moved along the desired line. The beam can be moved in a circular pattern by incorporating one magnetic deflection coil in a high frequency oscillator circuit and incorporating the other deflection coil in a tuned circuit coupled to the oscillator circuit.

The embodiments of the invention in which an exclusive property or privilege is claimed are defined as follows:

1. For use in combination with a display device having magnetically deflectable means for describing lines on a target, apparatus for varying the thickness of said lines, said apparatus including:

first means including a first magnetic coil for deflecting said deflectable means with respect to said target along said lines;

second means for concurrently imparting motion to said deflectable means having a component substantially perpendicular to said lines, said second means including first and second deflection means acting substantially orthogonally to one another;

auxiliary deflection signal source means for applying substantially sinusoidal deflection signals displaced by substantially 90° to said first and second deflection means;

said auxiliary deflection signal source means including an amplifier; and circuit means, including said first magnetic coil, coupled to said amplifier for causing oscillations therein.

2. The apparatus of claim 1 including means for selectively controlling the amplitude of said oscillations in said amplifier.

3. The apparatus of claim 1 wherein said second deflection means comprises a second magnetic coil; and wherein said auxiliary deflection signal source means further includes a tuned circuit including said second magnetic coil; and means reactively coupling said amplifier to said tuned circuit.

4. The apparatus of claim 3 wherein said reactive coupling means includes means for varying the phase shift therethrough.

5. In combination with a cathode ray tube having major vertical and horizontal deflection means and auxiliary vertical and horizontal magnetic deflection coils, means for enabling the cathode ray tube beam to draw lines of different thickness said means comprising:

first means applying major deflection signals to said major deflection means for relatively slowly deflecting said beam along a desired line;

second means applying auxiliary deflection signals to said auxiliary deflection means for imparting relatively rapid motion to said beam along a path having a component perpendicular to said desired line, said second means including an amplifier; and means including one of said auxiliary deflection coils coupled to said amplifier for causing oscillations therein.

6. The apparatus of claim 5 wherein said second means includes means for respectively applying substantially sinusoidal signals displaced by substantially 90° to said auxiliary vertical and horizontal deflection coils.

7. The apparatus of claim 5 wherein said second means further includes a tuned circuit including the other of said auxiliary deflection coils; and means coupling said amplifier to said tuned circuit for causing oscillations therein.

8. The apparatus of claim 5 including means for varying the amplitude of said oscillations.

References Cited

UNITED STATES PATENTS

| | | | |
|---|---|---|---|
| 2,676,283 | 4/1954 | Becking | 315—24 |
| 2,961,576 | 11/1960 | Burgett | 315—21 |

RODNEY D. BENNETT, Jr., *Primary Examiner.*

B. L. RIBANDO, *Assistant Examiner.*